United States Patent
Chopra et al.

(10) Patent No.: US 11,194,674 B2
(45) Date of Patent: *Dec. 7, 2021

(54) DIRECT ACCESS TO BACKUP COPY

(71) Applicant: EMC IP Holding Company LLC, Hopkinton, MA (US)

(72) Inventors: Shelesh Chopra, Bangalore (IN); Vladimir Mandic, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/891,815

(22) Filed: Jun. 3, 2020

(65) Prior Publication Data

US 2020/0293411 A1 Sep. 17, 2020

Related U.S. Application Data

(63) Continuation of application No. 16/041,303, filed on Jul. 20, 2018, now Pat. No. 10,713,125, which is a continuation of application No. 14/752,382, filed on Jun. 26, 2015, now Pat. No. 10,061,659.

(51) Int. Cl.
*G06F 11/14* (2006.01)

(52) U.S. Cl.
CPC ...... *G06F 11/1469* (2013.01); *G06F 11/1448* (2013.01); *G06F 11/1464* (2013.01); *G06F 2201/815* (2013.01)

(58) Field of Classification Search
CPC .. G06F 11/14; G06F 11/1469; G06F 11/1464; G06F 11/1448; G06F 2201/815
See application file for complete search history.

(56) References Cited

U.S. PATENT DOCUMENTS

| | | | |
|---|---|---|---|
| 6,816,980 B1 * | 11/2004 | Fukuhara | H04L 69/40 714/11 |
| 7,093,086 B1 | 8/2006 | Van Rietschote | |
| 7,721,138 B1 * | 5/2010 | Lyadvinsky | G06F 11/1464 714/4.1 |
| 7,840,963 B2 * | 11/2010 | Traut | G06F 11/2097 718/1 |
| 7,844,853 B2 * | 11/2010 | Barsness | G06F 11/1438 714/6.12 |
| 7,934,119 B2 | 4/2011 | Takamoto | |
| 8,195,980 B2 * | 6/2012 | Schuba | G06F 9/45558 714/15 |
| 8,356,285 B2 * | 1/2013 | Schuba | G06F 9/45558 717/127 |
| 8,793,531 B2 * | 7/2014 | George | G06F 3/0613 714/6.3 |
| 8,843,783 B2 * | 9/2014 | Cox | G06F 11/2058 714/6.23 |
| 9,703,644 B1 | 7/2017 | Jagannatha | |
| 9,934,106 B1 | 4/2018 | Amarnath | |

(Continued)

*Primary Examiner* — Kamini B Patel
(74) *Attorney, Agent, or Firm* — Krishnendu Gupta; Nikhil Patel

(57) ABSTRACT

Techniques to provide direct access to backup data are disclosed. An indication is received to provide access to backup data backed up previously to a target device. The backup data as stored on the target device is used to spawn on the target device a logical volume corresponding to the backup data. Access to the logical volume as stored on the target device is provided to a production host.

20 Claims, 4 Drawing Sheets

(56) References Cited

U.S. PATENT DOCUMENTS

| | | |
|---|---|---|
| 10,223,206 B1 | 3/2019 | Dobrean |
| 10,713,125 B2 * | 7/2020 | Chopra ............... G06F 11/1469 |
| 2005/0216788 A1 * | 9/2005 | Mani-Meitav ...... G06F 11/1464 |
| | | 714/6.32 |
| 2010/0049930 A1 | 2/2010 | Pershin |
| 2012/0017114 A1 * | 1/2012 | Timashev ........... G06F 11/1451 |
| | | 714/15 |
| 2018/0329787 A1 * | 11/2018 | Chopra ............... G06F 11/1469 |

* cited by examiner

300

| Saveset name | Static Image name | Timestamp |
|---|---|---|
| /FS1 | XXXXXXXXXXXXXX | YY:ZZ:AA |
| /FS1 | YYYYYYYYYYYYYY | CC:ZZ:DD |
| /FS1 | ZZZZZZZZZZZZZZ | DD:DD:DD |
| /FS1 | AAAAAAAAAAAA | EE:FF:GG |

DIRECT ACCESS TO BACKUP COPY

CROSS REFERENCE TO OTHER APPLICATIONS

This application is a continuation of U.S. patent application Ser. No. 16/041,303, entitled DIRECT ACCESS TO BACKUP COPY filed Jul. 20, 2018 which is a continuation of U.S. patent application Ser. No. 14/752,382, entitled DIRECT ACCESS TO BACKUP COPY filed Jun. 26, 2015, now U.S. Pat. No. 10,061,659 which is incorporated herein by reference for all purposes.

BACKGROUND OF THE INVENTION

Backup applications and related technology have evolved to reduce the time and resources required to create and store backup copies of production data. For example, snapshot technology enables backup data to be generated quickly and efficiently, such as by enabling only data that has been changed since the last backup to be stored. De-duplicating storage systems, such as EMC® Data Domain® de-duplicating storage systems, have been used to store backup data efficiently. For production data stored on a separate storage array, such as an EMC® VMAX® storage array, current technologies enable backup data to be sent directly from the storage array to a backup data storage system ("target device"), such as a Data Domain® storage system, without having to pass through the application server or other node.

While approaches to generating and storing backup data have evolved, as described above, restore operations typically remain time consuming and resource intensive tasks. For example, to recover a prior version of even a single file from a backup the backup data must be read and used to restore to a restore target, such as the storage array on which the source data was stored, a logical unit of production data, such as a LUN or volume. Such a restore operation may be time consuming, and consumes resources on the backup target device, the production system to which the data set is restored, and the intervening network, among other resources.

BRIEF DESCRIPTION OF THE DRAWINGS

Various embodiments of the invention are disclosed in the following detailed description and the accompanying drawings.

DETAILED DESCRIPTION

Figure 1A:
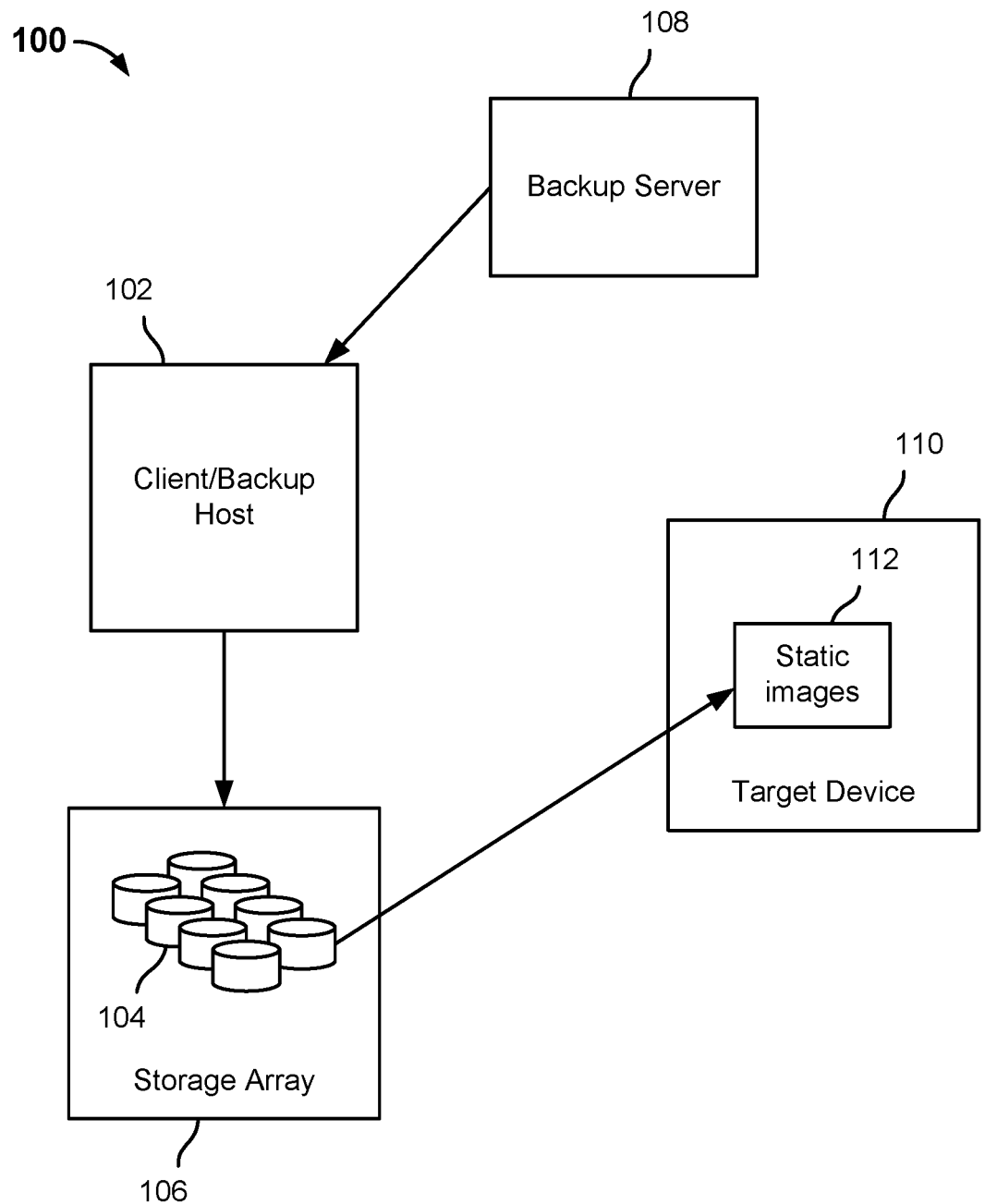
FIG. 1A is a block diagram illustrating an embodiment of a system and process to back up data.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Providing production access to backup data directly from a target device on which the backup data is stored is disclosed. In various embodiments, data is backed up from a production system to a target backup device, such as an EMC® Data Domain® de-duplicating storage system. In some embodiments, the production data may comprise a logical unit of data, such as a file system LUN. The LUN may be stored on a storage array that is separate from a production host, such as an application server, with which the data is associated. The LUN may include a plurality of virtual disks (vDisks) or other files. In some embodiments, data may be sent from a production storage array, such as an EMC® VMAX® storage array, directly to a target device.

In various embodiments, access to the backup data stored on the target device may be provided directly from the target device. Backup data store as one or more static images may be used on the target device to spawn and store on the target device an active LUN, such as a set of virtual disks. Access to the virtual disks (or other restored data) may be provided directly from the target device, e.g., by providing to a production host to be used to access the data as a mount point or other access construct data to enable the production host to access the restored data directly from the target device.

In some embodiments, a full recovery may be indicated, which results in the restored LUN (or other logical set of data) being transferred to a restore destination, such as a production storage array from which the associated production data was backed up.

FIG. 1A is a block diagram illustrating an embodiment of a system and process to back up data. In the example shown, backup system and environment 100 includes a production client/backup host 102, such as an application server. The production host 102 generates and manages data stored in a production LUN 104, such as a file system volume or other logical set of data. The production LUN 104 is stored on a storage array 106, such as an EMC® VMAX® storage array. A backup server 108 manages backup of the production LUN 104 via transfer of data directly from storage array 106 to a backup target device 110, e.g., an EMC® Data Domain® de-duplicating storage system. The backed up production LUN data is stored on the target device 110 as one or more static images 112.

In a typical prior approach, to restore data that has been backed up to a target device, as in the example shown in FIG. 1A, the static images 112 would be used to spawn a virtual disk LUN on the target device, which would then be transferred to a restore destination system, e.g., the storage array 106 in the example shown in FIG. 1A. However, as noted above, such an approach takes time and consumes resources. In addition, manual intervention and/or active supervision by an administrator may be required to ensure the restore operation progresses through to completion. In the prior approach, once data had been restored to a production system, such as storage array 106, the production host, e.g., client/backup host 102 in the example shown in FIG. 1A, would access the data from the recover destination (e.g., storage array 106) in the same manner as the production LUN.

Figure 1B:
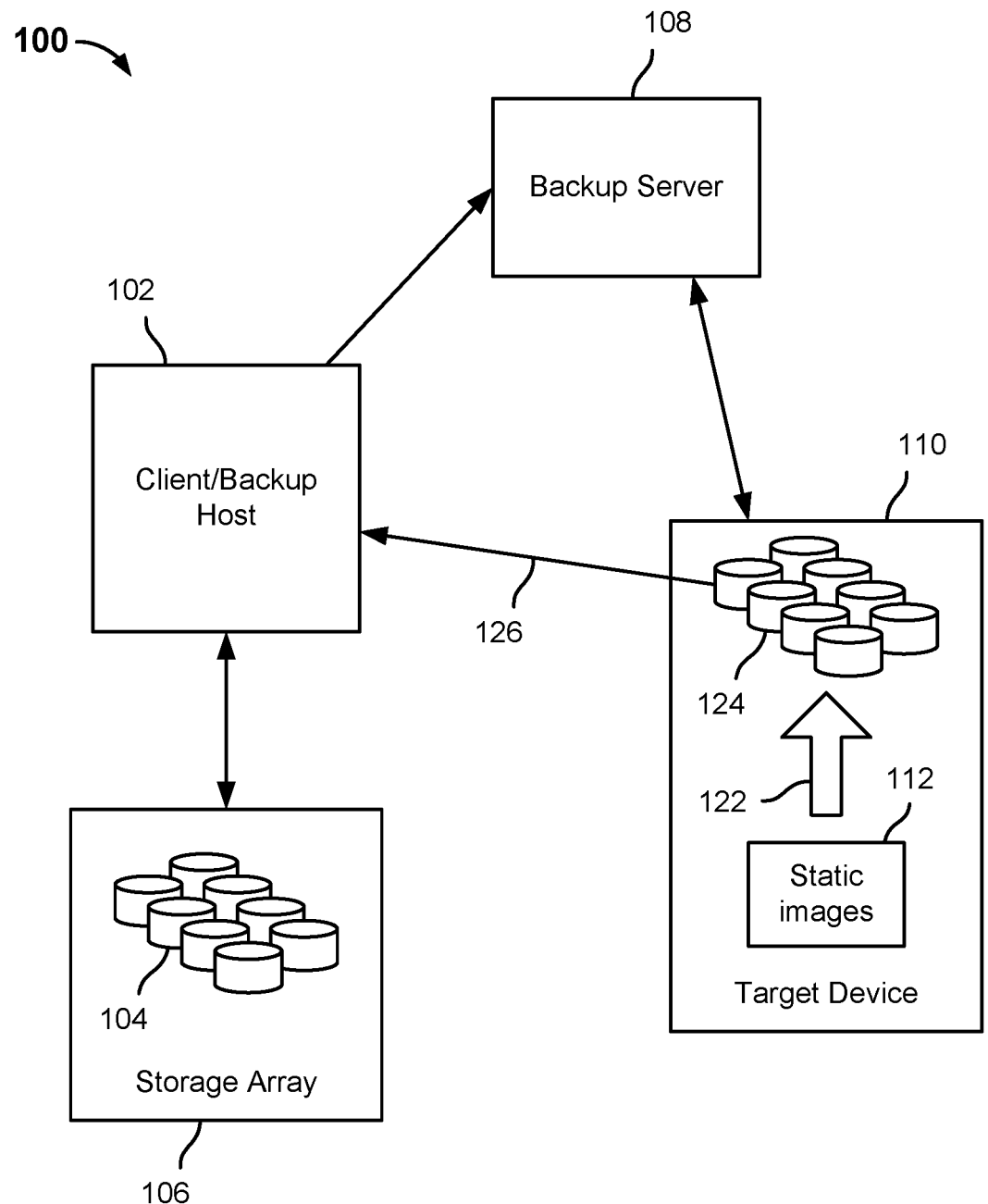
FIG. 1B is a block diagram illustrating an embodiment of a system and process to provide access to backup data directly from a backup storage device.

FIG. 1B is a block diagram illustrating an embodiment of a system and process to provide access to backup data directly from a backup storage device. In the example shown, access to previously backed up data is provided to a production host, e.g., client/backup host 102 in the example shown, directly from a target device to which the data has been backed up, e.g., target device 110. In the example shown, upon receiving an indication to provide direct access to previously backed up data, the target device 110 uses previously stored static images 112 to spawn 122 a vDisk LUN 124. In various embodiments, a recovery service or process of the target device may be used to spawn the vDisk LUN 124. Access to the vDisk LUN 124 is provided to the production host (i.e., client/backup host 102) directly from the target device 110. For example, a file system or other mount point 126 may be provided to the production host. The production host may use the mount point to access the spawned vDisk LUN 124, directly from the target device 110. For example, the mount point may be used to expose the spawned vDisk LUN 124 to the production host as a virtual/remote drive. In various embodiments, direct access provided from the target device 110, as disclosed herein, would enable the production host to access files or other objects in a state at which they existed at a time the corresponding backup was performed.

Figures 2, 3:
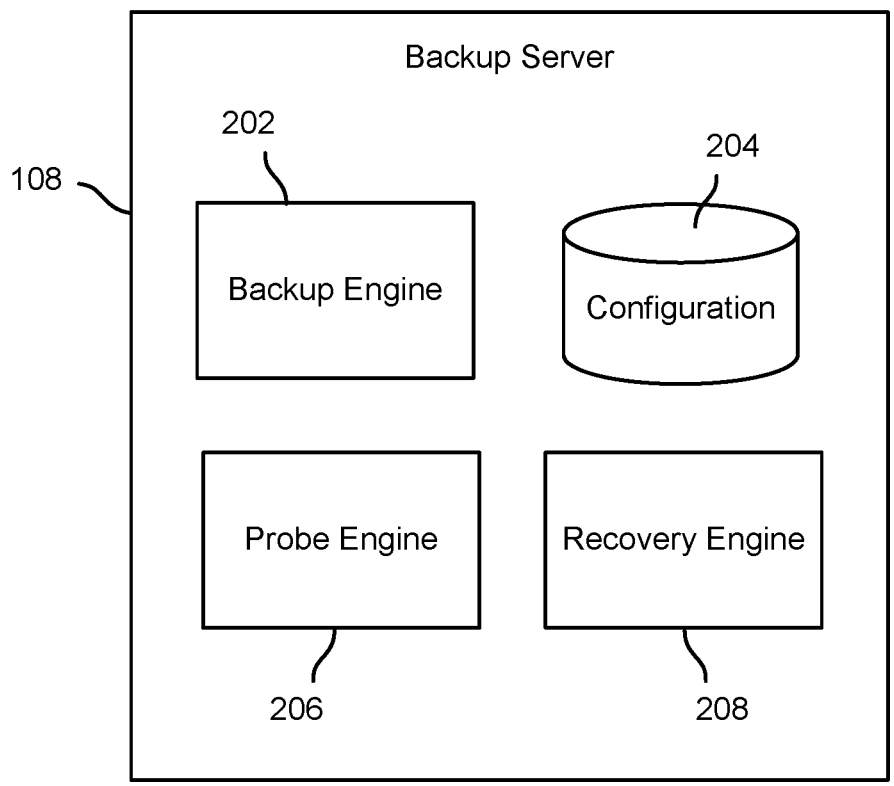
FIG. 2 is a block diagram illustrating an embodiment of a backup server.
FIG. 3 is a block diagram illustrating an embodiment of a save set selection user interface.

FIG. 2 is a block diagram illustrating an embodiment of a backup server. In the example shown, backup server 108 of FIGS. 1A and 1B includes a backup engine 202 configured to use configuration data stored in a configuration data store 204 to coordinate and perform backup operations. In various embodiments, backup engine 202 may be provided by using a processor comprising backup server 202 (not shown) to execute computer instructions stored in memory or some other storage media/device (not shown). The backup server 108 further includes a probe engine 206. In various embodiments, the probe engine 206 is configured to query a target device on which backup data is stored to determine identifying information and other metadata regarding the backups stored on the target device. In various embodiments, data gathered by the probe engine 206 may be used to provide, e.g., via an administrative user interface, a list of backups available to be restored and accessed directly from the target device.

The backup server 108 further includes a recovery engine 208. In various embodiments, recovery engine 208 is configured to receive an indication of a backup to which access is to be provided directly from the target device, and to cause the associated backup data (e.g., static images) to be used to spawn a vDisk LUN on the target device, and to provide to a production host associated with a request to access the data as a mount point or other data usable to access the vDisk LUN directly from the target device.

FIG. 3 is a block diagram illustrating an embodiment of a save set selection user interface. In various embodiments, a user interface such as save set selection user interface 300 may be populated with data obtained from a target device by a probe engine, such as probe engine 206 of FIG. 2. In some embodiments, a production save set name or other identifier may be received, e.g., via a restore user interface provided by a backup client or other agent running on a production host, such as client/backup host 102 of FIGS. 1A and 1B. In the example shown, four different backups of a save set named "/FS1", e.g., corresponding to a production LUN, such as production LUN 104 of FIG. 1A, are shown. For each backup of the save set, a corresponding static image name and backup timestamp are shown. In some embodiments, selection of a backup (row) in save set selection user interface 300 results in a recovery engine, such as recovery engine 208 in the example shown in FIG. 2, being invoked to cause the corresponding static image to be used to spawn a vDisk LUN on the target device on which the static image is stored, and to provide access to the vDisk LUN directly from the target device, as disclosed herein.

In the example embodiment shown in FIG. 3, there is a 1:1 correlation between file system that is being backed up and the static image as stored on the backup storage node. However, in various embodiments, a probe engine, such as probe engine 206 of FIG. 2, may be configured to determine an actual map of the original file system and the LUNs comprising the file system. In some embodiments, a file system may include more than one LUN. In some embodiments, an optional volume manager component (e.g., LVM2 or VxVM) may be included between the file system and the actual LUNs, as in the following example:

Filesytems view:
Filesystem Mounted on
/dev/mapper/system-home/home
Volume manager view:
Logical Volume Path: /dev/system/home
Volume Group Name: system
Volume view:
Physical Volume Name: /dev/sda1
Volume Group Name: system In the above example, a LUN visible on a system as "sda1" is member of volume-group "system" and that volume-group is used to build a filesystem "/home". There could be any number of volumes or groups used to build a functional filesystem, and in various embodiments that relationship is captured by a probe engine, such as probe engine 206 of FIG. 2, and is used to re-create a logical view of a system once restored vDisk LUNs are made accessible to production host. The foregoing approach may not be required to restore vDisk LUNs to the source storage array from which they were backed up, as the relationship is on the LUN to vDisk level and higher level entities such as volumes or filesystems may not be aware of it.

Figure 4:
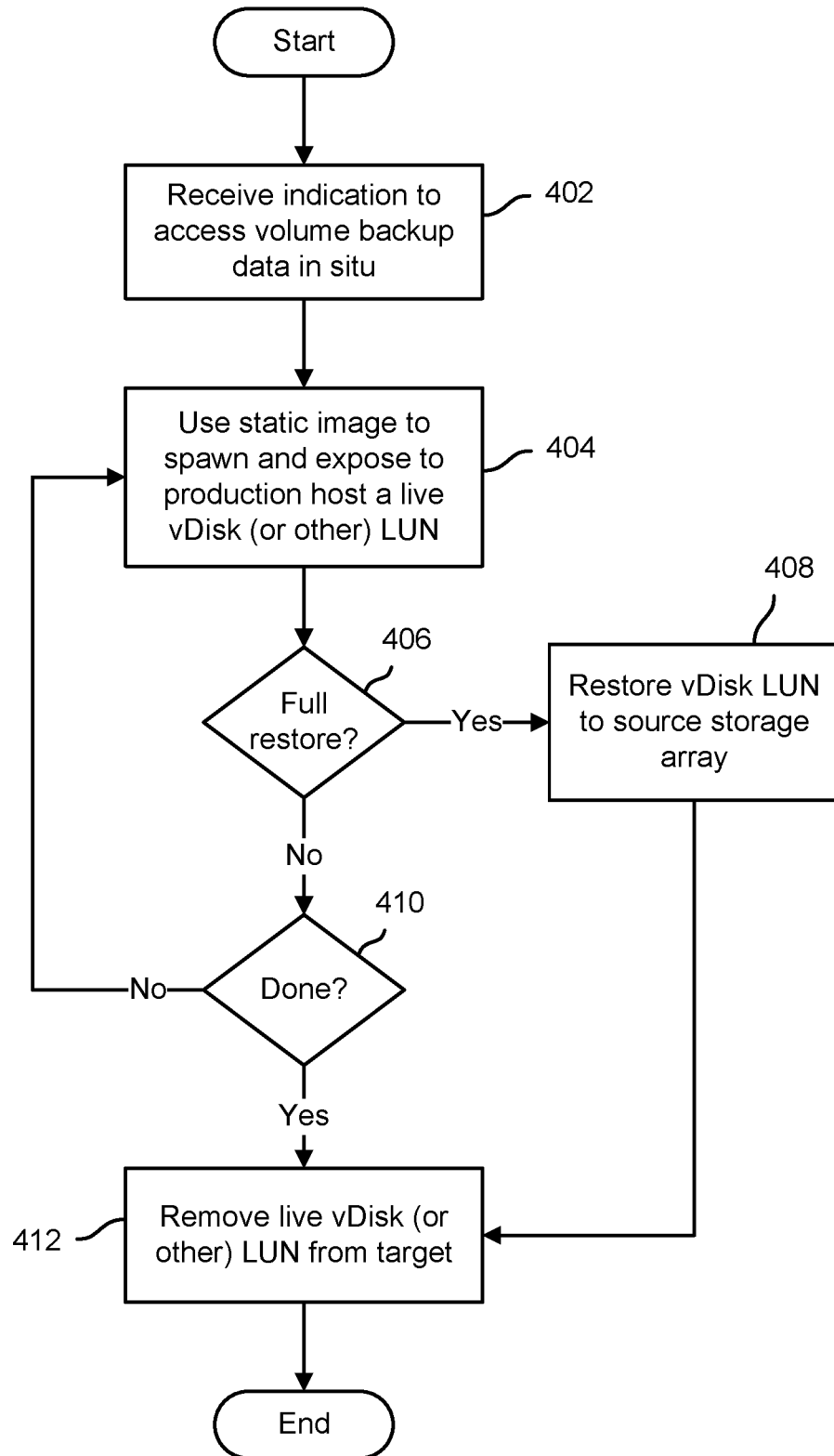
FIG. 4 is a flow chart illustrating an embodiment of a process to provide access to backup data directly from a backup storage device.

FIG. 4 is a flow chart illustrating an embodiment of a process to provide access to backup data directly from a backup storage device. In various embodiments, the process of FIG. 4 may be performed by a backup server, such as backup server 108 of FIGS. 1A and 1B, and/or a component thereof, such as recovery engine 208 of FIG. 2. In the example shown, an indication is received to provide access to a backed up volume directly from a target device to which the volume was backed up (402). A static backup image stored on the target device is used to spawn a vDisk LUN, and provide to a production host access to the vDisk LUN directly from the target device (404). For example, a mount point or other access construct usable by the production host to mount the vDisk LUN as a remote disk and/or other file system abstraction may be provided. If an indication is received (e.g., via a restore or other backup application user interface) to fully restore the data (406), then the vDisk LUN is restored to a destination node, e.g., the source storage array from which the data was backed up (408). Once the data has been restored to the production storage array, if requested (406, 408), or if not once the user provides an indication that access to the vDisk LUN is no longer needed (410), the vDisk LUN is removed (e.g., deleted) from the target device (412) and the process of FIG. 4 ends. In various embodiments, the static image that was used to provide direct access to the backup data in the form of the vDisk LUN remains stored on the target device and available to be used to perform subsequent restore operations, if needed, subject to backup data retention, grooming, and/or migration policies, as configured.

Techniques disclosed herein may enable access to backup data to be provided quickly with minimal use of resources.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
providing, by the backup server, to a production host access to a logical volume that is spawned on a target device, the production host being provided access in a manner that logical volume is usable directly from the target device; and
in response to a determination that backup data corresponding to the logical volume has been restored to a production system, removing the logical volume that is spawned on the target device.

2. The method of claim 1, further comprising:
receiving, by a backup server, a request to provide access to backup data that is stored on the target device; and
in response to receiving the request to provide access to the backup data, spawning the logical volume corresponding to the backup data stored on the target device, wherein the logical volume is spawned on the target device.

3. The method of claim 1, wherein the logical volume that is spawned on the target device includes files or objects in a state at which the files or objects existed at a time when a corresponding backup was performed.

4. The method of claim 1, further comprising,
backing up, by the backup server, the backup data stored on a production computing system to the target device.

5. The method of claim 1, wherein the providing access to the logical volume to the production host comprises the production host directly accessing the logical volume stored on the target device from the target device as a mount point.

6. The method of claim 1, wherein the backup data comprises a save set associated with the production host.

7. The method of claim 1, wherein the backup data is stored on the target device as one or more static images.

8. The method of claim 1, further comprising receiving an indication to complete a full restoration of the backed up data.

9. The method of claim 8, further comprising moving the logical volume from the target device to a production storage system from which the backed up data was backed up.

10. A system, comprising:
one or more processors; and
a memory or other storage device coupled to the one or more processors and configured to store computer instructions which when executed by the one or more processors cause the processor to perform the steps of:
providing to a production host access to a logical volume that is spawned on a target device, the production host being provided access in a manner that logical volume is usable directly from the target device; and
in response to a determination that backup data corresponding to the logical volume has been restored to a production system, removing the logical volume that is spawned on the target device.

11. The system of claim 10, wherein the computer instructions which when executed by the one or more processors further cause the processor to perform the steps of:
receiving, by a backup server, a request to provide access to backup data that is stored on the target device; and
in response to receiving the request to provide access to the backup data, spawning the logical volume corresponding to the backup data stored on the target device, wherein the logical volume is spawned on the target device.

12. The system of claim 10, wherein the logical volume that is spawned on the target device includes files or objects in a state at which the files or objects existed at a time when a corresponding backup was performed.

13. The system of claim 10, wherein the computer instructions which when executed by the one or more processors further cause the processor to perform the step of:
backing up, by the backup server, the backup data stored on a production computing system to the target device.

14. The system of claim 10, wherein the providing access to the logical volume to the production host comprises the production host directly accessing the logical volume stored on the target device from the target device as a mount point.

15. The system of claim 10, wherein the backup data comprises a save set associated with the production host.

16. A computer program product to provide access to backed up data, the computer program product being embodied in a non-transitory computer readable medium associated with a backup server, and comprising computer instructions for:
causing the backup server to provide to a production host access to the logical volume that is spawned on a target device, the production host being provided access in a manner that logical volume is usable directly from the target device; and
causing the logical volume that is spawned on the target device to be removed in response to a determination that backup data corresponding to the logical volume has been restored to a production system.

17. The computer program product of claim 16, further comprising computer instructions for:
receiving, by a backup server, a request to provide access to backup data that is stored on the target device; and
in response to receiving the request to provide access to the backup data, spawning the logical volume corresponding to the backup data stored on the target device, wherein the logical volume is spawned on the target device.

18. The computer program product of claim 16, wherein the logical volume that is spawned on the target device includes files or objects in a state at which the files or objects existed at a time when a corresponding backup was performed.

19. The computer program product of claim 16, wherein the computer instructions which when executed by the one or more processors further cause the processor to perform the step of:

backing up, by the backup server, the backup data stored on a production computing system to the target device.

20. The computer program product of claim 16, wherein the providing access to the logical volume to the production host comprises the production host directly accessing the logical volume stored on the target device from the target device as a mount point.

\* \* \* \* \*